US011639028B2

(12) United States Patent
Wiesner et al.

(10) Patent No.: US 11,639,028 B2
(45) Date of Patent: May 2, 2023

(54) METHOD AND DEVICE FOR CONTROLLING AN IRRADIATION SYSTEM FOR PRODUCING WORKPIECES

(71) Applicant: SLM SOLUTIONS GROUP AG, Lübeck (DE)

(72) Inventors: Andreas Wiesner, Lübeck (DE); Jan Wilkes, Lübeck (DE); Christiane Thiel, Lübeck (DE); Lukas Roesgen, Lübeck (DE)

(73) Assignee: SLM Solutions Group AG, Lübeck (DE)

( * ) Notice: Subject to any disclaimer, the term of this patent is extended or adjusted under 35 U.S.C. 154(b) by 273 days.

(21) Appl. No.: 16/487,290

(22) PCT Filed: Jan. 15, 2018

(86) PCT No.: PCT/EP2018/050843
§ 371 (c)(1),
(2) Date: Aug. 20, 2019

(87) PCT Pub. No.: WO2018/153573
PCT Pub. Date: Aug. 30, 2018

(65) Prior Publication Data
US 2019/0375012 A1    Dec. 12, 2019

(30) Foreign Application Priority Data

Feb. 22, 2017    (DE) .................... 10 2017 202 843.2

(51) Int. Cl.
*B22F 3/105*    (2006.01)
*B29C 64/153*    (2017.01)
(Continued)

(52) U.S. Cl.
CPC ............ *B22F 3/105* (2013.01); *B29C 64/153* (2017.08); *B29C 64/393* (2017.08); *B33Y 10/00* (2014.12);
(Continued)

(58) Field of Classification Search
CPC ... B29C 64/277; B29C 64/282; B29C 64/153; B29C 64/393; B22F 3/1055;
(Continued)

(56) References Cited

U.S. PATENT DOCUMENTS 5,711,911 A    1/1998 Hull
2005/0142024 A1    6/2005 Herzog
(Continued)

FOREIGN PATENT DOCUMENTS

CN    104972121    10/2015
CN    105451971    3/2016
(Continued)

OTHER PUBLICATIONS

Examination Report, Intellectual Property of China, CN Patent Application No. 201880020170.2, dated Apr. 20, 2021.
(Continued)

*Primary Examiner* — Philip C Tucker
*Assistant Examiner* — Jimmy R Smith, Jr.
(74) *Attorney, Agent, or Firm* — Williams Mullen; Thomas F. Bergert

(57) ABSTRACT

The invention relates to a method for controlling an irradiation system (20), the irradiation system (20) being used in a device (10) for the additive manufacturing of three-dimensional workpieces and comprising at least three irradiation units (22a-d, 50), the method comprising the following steps: a) defining an irradiation region (30a-d) for each of the irradiation units (22a-d, 50), the irradiation regions (30a-d) each comprising a portion of an irradiation plane
(Continued)

Figure 1:
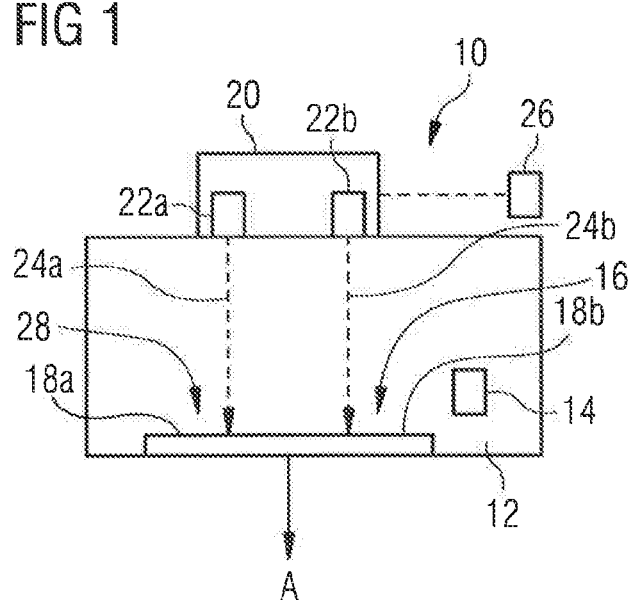

(28) which extends parallel to a carrier (16) of the device (10), and the irradiation regions (30*a-d*) being defined such that they overlap in a common overlap region (34); b) irradiating a raw material powder layer on the carrier (16) to produce a workpiece layer; c) arranging a further raw material powder layer on the already jetted raw material powder layer to produce a further workpiece layer. d) The invention also relates to a device for performing this method.

18 Claims, 3 Drawing Sheets

(51) Int. Cl.
  *B33Y 30/00* (2015.01)
  *B29C 64/393* (2017.01)
  *B33Y 10/00* (2015.01)
  *B33Y 50/02* (2015.01)
  *B29C 64/277* (2017.01)
(52) U.S. Cl.
  CPC ............... *B33Y 30/00* (2014.12); *B33Y 50/02* (2014.12); *B22F 2202/11* (2013.01); *B22F 2203/03* (2013.01); *B22F 2999/00* (2013.01); *B29C 64/277* (2017.08)
(58) Field of Classification Search
  CPC ...... B22F 2003/1056; B22F 2003/1057; B22F 2003/1058; B22F 2003/1059; B22F 10/20; B22F 10/28; B22F 10/366; B22F 12/45; B22F 12/49; B22F 2202/11; B22F 2203/03; B22F 2999/00; B22F 3/105; B33Y 10/00; B33Y 30/00; B33Y 50/02; Y02P 10/25
  See application file for complete search history.

(56) References Cited

U.S. PATENT DOCUMENTS

| | | | |
|---|---|---|---|
| 2013/0112672 A1 | 5/2013 | Keremes et al. | |
| 2014/0348691 A1 | 11/2014 | Ljungblad et al. | |
| 2015/0210013 A1 | 7/2015 | Teulet | |
| 2016/0114432 A1* | 4/2016 | Ferrar | B23K 26/0604 219/76.12 |
| 2017/0173737 A1* | 6/2017 | Gray | B33Y 30/00 |

FOREIGN PATENT DOCUMENTS

| | | |
|---|---|---|
| DE | 10053742 | 5/2002 |
| DE | 102005014483 | 10/2006 |
| EP | 2221132 | 8/2010 |
| EP | 2818305 | 12/2014 |
| EP | 2862651 | 4/2015 |
| EP | 2875897 | 5/2015 |
| EP | 2926979 | 10/2015 |
| EP | 2875897 | 1/2016 |
| EP | 3120967 | 1/2017 |
| JP | 2009006509 | 1/2009 |
| WO | 2002036331 | 5/2002 |
| WO | 2013070317 | 5/2013 |
| WO | 2014187606 | 11/2014 |
| WO | 2014199134 | 12/2014 |
| WO | 2014199149 | 12/2014 |
| WO | 2016110440 | 7/2016 |

OTHER PUBLICATIONS

International Search Report and Written Opinion for PCT/EP2018/050843, European Patent Office, dated Apr. 16, 2018.

* cited by examiner

METHOD AND DEVICE FOR CONTROLLING AN IRRADIATION SYSTEM FOR PRODUCING WORKPIECES

CROSS-REFERENCE TO RELATED APPLICATIONS

This application is the U.S. national phase of international application PCT/EP2018/050843, filed on Jan. 15, 2018, which claims the benefit of German application DE 10 2017 202 843.2 filed on Feb. 22, 2017; all of which are hereby incorporated herein in their entirety by reference.

The invention relates to a device and a method for controlling an irradiation system, wherein the irradiation system is used for the additive manufacture of three-dimensional workpieces. The irradiation system comprises at least three irradiation units with mutually overlapping irradiation regions.

In additive methods for the manufacture of three-dimensional workpieces, and in particular in additive layer building methods, it is known to solidify an initially shapeless or shape-neutral molding compound (for example a raw material powder) by location-specific irradiation and thereby bring it into a desired shape. Irradiation can take place by means of electromagnetic radiation, for example in the form of laser radiation. In a starting state, the molding compound can initially be in the form of granules, powder or a liquid molding compound and can be selectively or, in other words, location-specifically solidified as a result of the irradiation. The molding compound can comprise, for example, ceramics, metal or plastics materials and also material mixtures thereof. A variant of additive layer building methods relates to so-called powder bed fusion, in which in particular metallic and/or ceramics raw material powder materials are solidified to form three-dimensional workpieces.

In order to produce individual workpiece layers it is further known to apply raw material powder material in the form of a raw material powder layer to a carrier and to irradiate it selectively and in accordance with the geometry of the workpiece layer that is currently to be produced. The laser radiation penetrates the raw material powder material and solidifies it, for example as a result of heating, which causes fusion or sintering. Once a workpiece layer has solidified, a new layer of unprocessed raw material powder material is applied to the workpiece layer which has already been produced. Known coater arrangements can be used for this purpose. Irradiation is then again carried out on the raw material powder layer which is now uppermost and is as yet unprocessed. Consequently, the workpiece is gradually built up layer by layer, each layer defining a cross-sectional area and/or a contour of the workpiece. It is further known in this connection to use CAD or comparable workpiece data in order to manufacture the workpieces substantially automatically.

Solutions are also known in which the irradiation of the raw material powder material is carried out by an irradiation system which comprises a plurality of irradiation units. These are able to irradiate a single raw material powder layer together and thereby act in parallel or offset relative to one another in terms of time.

It will be appreciated that all of the aspects discussed above can likewise be provided within the context of the present invention.

An example of a solution in which a plurality of irradiation units together irradiate a single raw material powder layer is to be found in EP 2 875 897 A1. There are disclosed therein two irradiation units whose irradiation regions overlap in a common overlap region. A workpiece layer to be produced is first evaluated to determine which portions of the workpiece layer that are to be produced extend into the irradiation regions of the individual irradiation units and which portion extends into the common overlap region. These portions to be produced are then assigned to the respective irradiation units, wherein the portion in the common overlap region that is to be produced can be additionally subdivided.

The use of different irradiation units for jointly irradiating a raw material powder layer, which is synonymous with the joint production of a workpiece layer by different irradiation units, can lead to a shortening of the manufacturing time compared with the use of only one irradiation unit.

The inventors have, however, recognized that irradiation by means of different irradiation units can lead to inhomogeneities of the manufactured workpiece. This can relate especially to the workpiece structure and result in substantial quality defects of the manufactured workpiece.

Accordingly, the object of the present invention is to provide a device and a method for the additive manufacture of three-dimensional workpieces which permit a comparatively short manufacturing time with a high workpiece quality.

To that end there is provided a method for controlling an irradiation system, wherein the irradiation system is used in a device for the additive manufacture of three-dimensional workpieces and comprises at least three irradiation units. The device can be configured to manufacture the three-dimensional workpiece in the manner of selective laser sintering. The irradiation units can be configured to emit an electromagnetic processing beam, for example in the form of a laser beam. To that end they can comprise suitable processing optics and/or radiation sources or can be capable of being connected to such units. According to one embodiment, at least two of the irradiation units are connected to a common radiation source. The processing beam generated by the radiation source can thereby be split and/or deflected by suitable means in order to be guided to the individual irradiation units. There come into consideration as suitable means for that purpose beam splitters and/or mirrors.

The processing optics can guide at least one processing beam and/or interact therewith in the desired manner. For this purpose they can comprise objective lenses, in particular an f-theta lens.

The irradiation units can further comprise deflection devices for directing the emitted processing beams onto predetermined regions within an irradiation plane and thus onto predetermined regions of a raw material powder layer that is to be irradiated. The deflection devices can comprise so-called scanner units, which are preferably adjustable about at least two axes. In addition or alternatively, the irradiation units, or at least the regions thereof that emit beams, can be movable in space. This can include in particular a movement relative to an irradiation plane, so that the irradiation units can be located opposite different regions of the irradiation plane.

The method comprises the step a) of defining an irradiation region for each of the irradiation units, wherein the irradiation regions each comprise a portion of an irradiation plane which extends parallel to a carrier of the device, and wherein the irradiation regions are so defined that they overlap in a common overlap region.

The irradiation plane can be a two-dimensional planar plane. The irradiation plane can in each case comprise a raw material powder layer that is currently to be irradiated. Accordingly, its position relative to the carrier can change depending on the raw material powder layer that is to be irradiated. In particular, a distance from the carrier can increase as the manufacturing time and number of layers of the workpiece advance. The irradiation plane can further be arranged opposite the carrier and preferably be congruent with a build area defined by the carrier. The build area can be an area within which a workpiece can be manufactured. More precisely, the build area can define a maximum cross-sectional area of the workpiece that can be manufactured.

The irradiation regions can comprise an areal portion of the irradiation plane, wherein those areal portions can also overlap. In other words, it is provided that all the irradiation regions overlap at least in the common overlap region or, in other words, that all the irradiation regions coincide in the overlap region. The overlap region can thus define an areal portion of the irradiation plane into which all the irradiation regions extend. In addition, further overlap regions can also exist, in which only two of the irradiation regions overlap (in the following also: secondary overlap region).

The definition of the irradiation regions can take place by specifying the deflection spectrum of the deflection units of the irradiation units and/or by specifying a possible movement spectrum of the irradiation units. This can take place by defining suitable value ranges in a control unit of the device.

Outside the overlap region it can thus be provided that irradiation of the raw material powder layer within a particular irradiation region takes place only by means of the associated irradiation unit. According to a variant it is provided that a first irradiation region is associated with a first irradiation unit, a second irradiation region is associated with a second irradiation unit and a third irradiation region is associated with a third irradiation unit. Any further irradiation region can be associated with any further irradiation units. The first to third irradiation regions overlap in the overlap region. Outside the overlap region, however, it is provided in this variant that the remaining portion of the first irradiation region can be irradiated only by the first irradiation unit, the remaining portion of the second irradiation region can be irradiated only by the second irradiation unit, the remaining portion of the third irradiation region can be irradiated only by the third irradiation unit, and the remaining portion of any further irradiation regions can be irradiated only by the associated further irradiation units.

The method further provides the step b) of irradiating a raw material powder layer arranged on the carrier in order to produce a workpiece layer. The irradiation can take place via the irradiation units of the irradiation system, wherein, depending on the definition of the irradiation regions, they can irradiate different but, for example, in the overlap region also common portions of the raw material powder layer.

The carrier can be provided in a process chamber of the device. It can be a generally fixed carrier or a displaceable carrier which is displaceable in particular in the vertical direction. According to a variant, the carrier is lowered in the vertical direction as the number of workpiece layers produced increases and preferably in dependence on that number. The process chamber can be capable of being sealed with respect to the surrounding atmosphere in order to establish a controlled atmosphere, in particular an inert atmosphere, therein. The raw material powder layer can comprise all of the above-mentioned raw material powder materials and in particular a powder of a metal alloy. The powder can have any suitable particle size or particle size distribution. A particle size of the powder of <100 µm is preferred.

The application of the raw material powder layer to the carrier and/or to a raw material powder layer arranged thereon and already irradiated can take place via known coater units or powder application device. An example thereof is to be found in EP 2 818 305 A1.

Within the context of the present disclosure, the term "workpiece layer" can relate generally to a workpiece layer to be produced from a single raw material powder layer, that is to say in particular a cross-section that is to be produced of the workpiece. The workpiece layer can further comprise a contour, for example in the form of an outer contour or of an outline of the cross-section that is to be produced. In addition or alternatively, the workpiece layer can comprise an at least partially filled area, for example in order to produce a filled or solid cross-sectional area of the workpiece. For this purpose there can be used a predetermined scan or irradiation pattern in which a plurality of scan vectors are in known manner defined within the irradiation plane in order to permit substantially extensive solidification.

For the irradiation, an analysis can be carried out beforehand to determine which portions of the workpiece layer to be produced extend into the individual irradiation regions and into the common overlap region. Those portions outside the overlap region can be irradiated by the irradiation units which are associated with the irradiation regions in question. Within the overlap region, however, the plurality of the irradiation units are available for irradiation. Overall, the workpiece layer to be produced can thus be composed of the portions irradiated by each of the irradiation units. Further details of this procedure, which relate in particular to the splitting of a workpiece contour to be produced and/or of a scan or irradiation pattern between different irradiation units, are to be found in EP 2 875 897 A1 mentioned at the beginning.

The method further provides the step c) of arranging a further raw material powder layer on the already irradiated raw material powder layer in order to produce a further workpiece layer. This can make possible the described cyclic layer-by-layer manufacture of the workpiece, in which new raw material powder layers are continuously applied to already irradiated raw material powder layers, irradiated and solidified location-specifically.

The method according to the invention is characterized first in that at least three irradiation units are provided. In the common overlap region, a plurality of irradiation units are thus available, from which a flexible selection can be made.

According to the invention it can further be provided that the proportions of the irradiation regions in the irradiation plane are each between 0% and up to and including 100%; and/or that the proportion of the overlap region in the irradiation plane is between 0% and up to and including 100%. In other words, it is also possible to provide full-field coverage, in which the irradiation regions each cover up to about 100% of the irradiation plane. Consequently, each region of the irradiation plane can be irradiated by each of the irradiation units. Furthermore, the overlap region in this case likewise occupies a proportion of about 100% of the irradiation plane. Alternatively, it is, however, likewise conceivable that the overlap region and/or that the irradiation regions occupy not more than about 50% or not more than about 20% of the irradiation plane.

According to a further development, the irradiation units and/or the centers of the respective irradiation regions span a polygon. In other words, it can be provided that the irradiation units and/or the centers of the respective irradiation regions do not lie on a common line. For example, the at least three irradiation units can span a triangle and, where a fourth irradiation unit is provided, a quadrilateral. Likewise, it can be provided that the irradiation system comprises a plurality of groups which each comprise a specific number of irradiation units which define a corresponding polygon. These groups can be so arranged relative to one another that a predetermined pattern of irradiation units is obtained overall. In addition or alternatively, the irradiation units can be arranged in rows, wherein immediately adjacent rows are offset relative to one another in at least two directions (for example along X- and Y-axes running orthogonally to one another of the irradiation plane).

The centers of the irradiation regions can be understood as meaning a geometric center or, in other words, a geometric midpoint. The shape of the irradiation regions can generally be arbitrary and have, for example, a quadrilateral, pentagonal, hexagonal, heptagonal or octagonal shape. The center can be formed by the intersection of the diagonals between opposite corner points of that shape. A circular shape of the irradiation regions is also conceivable. According to a variant, all the irradiation regions have the same shape, for example a quadrilateral or hexagonal shape, and/or have the same size.

In the case of a plurality of groups of irradiation units too, it can be provided that the irradiation regions of in each case at least three irradiation units coincide in a common overlap region. In addition, there can also be overlap regions in which the irradiation regions of only two irradiation units coincide. It can further be provided that the irradiation region of an individual irradiation unit has a plurality of overlap regions with adjacent irradiation units and in particular a plurality of overlap regions with two further irradiation units. Primarily, at least half or all of the overlap regions can be formed by not more than three different irradiation regions, for example in order to avoid imprecise transitions within the workpiece structure manufactured in that region.

Preferably, the method further provides a step of selecting at least one irradiation unit to be used for irradiating the overlap region. In principle, all of the at least three irradiation units are available in the overlap region for performing an irradiation of the portion of the raw material powder layer in that region. According to the present further development, at least one, at least two or generally up to n-1 irradiation units can be selected from the totality of the irradiation units, where n indicates the total number of irradiation units. In principle it is, however, also conceivable that, at least for the irradiation of selected raw material powder layers, all of the irradiation units are selected for irradiating the overlap region.

A further development provides that the selection step is carried out again before the further workpiece layer is irradiated, that is to say, for example, before the further workpiece layer is irradiated according to method step c).

Accordingly, it can be provided that the step of selecting the irradiation units to be used for the overlap region is repeated layer by layer. The selection of the irradiation units can generally be made according to the contour, the irradiation pattern or other characteristics of the workpiece layer currently to be produced and can thus also be individually adapted layer by layer. In addition or alternatively, the selection can be made according to one of the criteria discussed hereinbelow, wherein all the selection criteria can be weighted relative to one another, prioritized and/or build hierarchically on one another in order to select in a preferred manner the irradiation units to be used in the overlap region.

The method can further provide that the selection of the irradiation units to be used for the overlap region differs between two successive raw material powder layers. In other words, this variant provides that the groups of irradiation units defined by the selection differ from one another between two successive raw material powder layers, wherein these groups can also comprise only one irradiation unit. In other words, based on successive raw material powder layers, the irradiation units selected and thus usable can be changed layer by layer.

For example, a first and a second irradiation unit can be selected for the irradiation of a first raw material powder layer in the overlap region. For the irradiation of a following second raw material powder layer in the overlap region there can then be selected, on the other hand, only the first, only the second or only the third irradiation unit as well as, alternatively, the second and the third irradiation units or the first and the third irradiation units. The first and the second irradiation unit, on the other hand, cannot be used again for irradiating the overlap region of this further raw material powder layer.

By selecting different usable groups of irradiation units for successive raw material powder layers (i.e. by making different selections), the overlap region is irradiated layer by layer by different irradiation units. In other words, the usable irradiation units can be changed before each raw material powder layer to be irradiated, so that individual influences of individual irradiation units on the workpiece structure become less noticeable at least in the overlap region. The homogeneity of the workpiece structure and the quality of the workpiece can thus be improved.

It will be noted that this can also be applied to a plurality of, for example, 100 raw material powder layers, wherein before each irradiation of one of those raw material powder layers, a fresh selection and thus a fresh change of the irradiation units which can be used in the overlap region can take place. It will further be appreciated that it can also be provided according to the invention that such a change of the selected irradiation units is not carried out between each of the raw material powder layers to be irradiated. Instead, this selection can, for example, also be kept constant over a predetermined number of successive raw material powder layers.

In general, it can be provided that the method is applied to at least two successive raw material powder layers to be irradiated. The number of successive raw material powder layers to be irradiated can likewise comprise at least 10, at least 50, at least 200 or at least 500. Likewise, it can be provided that, in respect of an operation of manufacturing a single workpiece, a plurality of groups of successive raw material powder layers to be irradiated are defined, within which the present method is applied, not, however, between those groups. Primarily, the present method can be applied to at least 20%, at least 50%, at least 80% or about 100% of the raw material powder layers which are to be irradiated within the context of an operation of manufacturing an individual workpiece.

A further development provides that a plurality of irradiation units is selected for the irradiation of the overlap region, in order to irradiate the overlap region in parallel or in succession. By parallelizing the irradiation of the overlap region, the production time of the corresponding workpiece layer can be reduced.

According to a further embodiment, the following step is carried out for selecting the irradiation units for the overlap region:

selecting irradiation units for the irradiation of the overlap region in the irradiation regions of which the workpiece layer to be produced also extends outside the overlap region.

In particular, only such irradiation units can be selected for the irradiation of the overlap region. In other words, it can be provided that, for the irradiation of the overlap region, no irradiation unit is selected that is not used further outside the overlap region for producing the current workpiece layer. To that end it can first be determined in a preceding step in which processing regions a workpiece layer currently to be produced also extends outside the overlap region. A better transition can thus be achieved in the workpiece structure between the overlap region and the adjoining portions of the workpiece layer, since the smallest possible number of irradiation units is used therefor. In this connection it can further be provided that predominantly or only those irradiation units that produce portions of the workpiece layer that directly adjoin the overlap region are selected. In other words, it can be provided that an evaluation is carried out to determine the irradiation regions into which the workpiece layer to be produced directly extends starting from the overlap region. It is then possible to select predominantly or only those irradiation units which are associated with those irradiation regions. Consequently, it can also be provided, for the irradiation of the overlap region, not to select any irradiation units which produce portions of the workpiece layer to be produced at any point outside the overlap region. Instead, irradiation units that operate in the immediate vicinity of or at the transition to the overlap region can be selected.

If the variant discussed above, according to which the selection of irradiation units for irradiating the overlap region should where possible be changed layer by layer, is provided at the same time, a prioritization between those selection criteria can also be made. For example, it can be provided that a selection of possible irradiation units is first made in consideration of the portions of the workpiece layer that are to be produced outside the overlap region, whereupon it is then checked whether those irradiation units allow the irradiation units which can be used in the overlap region to be changed layer by layer. If that is not the case, the operation can, according to the prioritization, nevertheless be continued with the irradiation units first selected, or that selection is discarded and the irradiation units are selected solely to achieve the desired layer by layer change of the irradiation units used.

Alternatively, it can also be provided to select irradiation units for the irradiation of the overlap region in whose irradiation regions the workpiece layer to be produced does not extend outside the overlap region. This permits an improved utilization level of the irradiation units and/or a time saving in the production of an individual workpiece layer, since the overlap region can be irradiated by irradiation units which are otherwise not required. Outside the irradiation region, on the other hand, those irradiation units which are in any case required for producing a current workpiece layer can be used, since the workpiece layer to be produced also extends outside the overlap region in the irradiation regions thereof. Figuratively speaking, the irradiation units which already perform irradiation outside the overlap region can thus be relieved, since other irradiation units, which otherwise would not be required, are used within the overlap region. The portions of the workpiece layer to be produced overall can thus be distributed more evenly between the irradiation units. In particular, the manufacturing time of an individual workpiece layer can thus be reduced, since a higher degree of parallelization in the irradiation of the raw material powder layer can be achieved.

According to a further development it is provided that the definition of the irradiation regions is carried out in such a manner that the arrangement of the overlap region within the irradiation plane changes between two successive raw material powder layers. For example, the overlap region can be arranged in a first position within the irradiation plane for irradiating a first raw material powder layer, and for irradiating a second raw material powder layer it can be arranged in a second position, which is different from the first position.

In other words, it can be provided that the overlap region does not remain in a constant position or arrangement within the irradiation plane. Instead, it can be newly positioned for the irradiation of a following or even generally before each new raw material powder layer to be irradiated. It can thus be achieved that the overlap region, relative to the manufactured workpiece, does not maintain a locally constant position but can change its position at least between selected workpiece layers or in all the workpiece layers. Any inhomogeneities associated with the irradiation of the overlap region, such as, for example, imprecise transitions in the workpiece structure between the overlap region and the adjoining irradiation regions, can thus be reduced and/or distributed more evenly over the workpiece as a whole.

The irradiation regions can in this connection be redefined before or in parallel with the irradiation of a new raw material powder layer, whereby a new positioning of the overlap region can also be achieved. This can take place, for example, by suitably calculating a new position and extent of the irradiation regions and/or by reading out suitable, previously stored positions from a memory.

Primarily, the overlap region can thus preferably be displaced, for each layer, within the irradiation plane in at least two directions which are at an angle to one another, for example along mutually orthogonal axes. These can be a conventional X- and Y-axis of the irradiation plane or of the carrier build area. The displacement can take place randomly or according to a predetermined pattern. For example, the overlap region, considered over a plurality of successive raw material powder layers, can be displaced in the manner of a spiral within the irradiation plane.

The method can further method comprise the following steps:
  subdividing the overlap region into a plurality of partitioning regions which are each associated with at least one of the irradiation units; and
  changing the partitioning region boundaries, so that the partitioning regions differ from one another between two successive raw material powder layers.

This further development can help to avoid fixed or locally constant inhomogeneities in the workpiece structure by varying the irradiation conditions within the overlap region. In addition or alternatively, the overlap region itself can, however, also be variably positioned within the irradiation plane in the manner described above and/or the selection of the usable irradiation units can purposively be varied.

The partitioning regions, similarly to the irradiation regions, the overlap region and the irradiation plane, can define virtual regions within which the irradiation units can be used. When three irradiation units are used, for example, an overlap region of triangular shape can in turn be subdivided into individual triangles which form corresponding partitioning regions and are each associated with one of the irradiation units. Likewise, when four irradiation units are used, a quadrilateral overlap region can be defined, which can in turn be subdivided into individual quadrilaterals by corresponding partitioning regions. The position, size, number and/or shape of the partitioning regions can thereby purposively be varied between successive raw material powder layers by changing the partitioning region boundaries.

Consequently, a portion of the overlap region that is associated with each of the irradiation units can vary between the successive raw material powder layers. As a result, the irradiation units can perform different irradiation operations in the overlap region, even if the workpiece layer to be produced remains the same, since different partitioning regions are associated therewith layer by layer.

In general, the partitioning region boundaries can define predetermined regions in which a transfer between the irradiation units immediately takes place. In other words, irradiation can be performed by a first irradiation unit according to a predetermined irradiation vector or along a workpiece contour that is to be produced unit a partitioning region boundary is reached. When that boundary is crossed, the irradiation is continued by a second irradiation unit. However, it is likewise conceivable that the partitioning regions do not define a narrow region at which such a transfer immediately takes place. Instead, it can be provided, for example, that an irradiation unit continues an irradiation along a predetermined irradiation vector even beyond a partitioning region boundary, that is to say does not immediately cease irradiation on reaching the partitioning region. However, it can thereby be provided that the irradiation unit does not begin irradiation along further vectors which, from the point of view of the irradiation unit, only begin after the partitioning region boundary. In other words, the partitioning region boundary can define a region beyond which new irradiation operations cannot be begun by the irradiation units. This is relevant in particular when irradiation is to be performed along a plurality of parallel irradiation vectors with predetermined lengths in order to produce filled workpiece layers.

Further details of this procedure and the interaction of the partitioning region boundaries with the chosen irradiation strategy are to be found in EP 2875897. Within the context of the present disclosure, explicit reference is made to the discussion of FIGS. 4 and 5 of EP 2875897.

In this connection it can further be provided that the change of the partitioning region boundaries comprises a displacement of an intersection point of the partitioning region boundaries. If, for example, four irradiation units are used, each of which is associated with a quadrilateral partitioning region of the overlap region, the partitioning region boundaries can intersect at a common point which, when the partitioning regions are of the same size, corresponds to a geometric midpoint of the overlap region. The displacement of such an intersection point can generally take place within the irradiation plane and preferably in at least one of two directions extending at an angle to one another. Analogously to the displacement of the overlap region as a whole, the directions can be mutually orthogonal axes, for example the X- and Y-axes of the irradiation plane or of the carrier build area. It will be appreciated that, when the intersection point is displaced, the partitioning region boundaries can automatically be adjusted and the size ratios of the partitioning regions correspondingly change automatically.

The displacement of the intersection point can take place randomly or according to a predetermined pattern, wherein a spiral-shaped displacement over successive raw material powder layers may again be mentioned as being a suitable example.

A further development provides that the irradiation system comprises at least one group of at least three irradiation units, and the method further comprises the following steps:
    arranging the irradiation units in such a manner that the irradiation units together span a polygon; and
    defining the irradiation regions for each irradiation unit in such a manner that the common overlap region is arranged at least in part within the polygon.

As discussed above, in the case of a group of, for example, three irradiation units, a common triangle can be spanned. The overlap region can be positioned at least in part therein (for example in the middle). Each irradiation unit can thereby have a rectangular or square irradiation region. As a further example there may be mentioned a group of three irradiation units which each have a hexagonal irradiation region. In general, each irradiation unit of such a group can have an irradiation region which also overlaps with at least one irradiation region of a further irradiation unit from an adjacent group.

The invention relates further to a device for the layer by layer manufacture of three-dimensional workpieces, comprising:
    an irradiation system having at least three irradiation units;
    a carrier, which is adapted to receive a raw material powder layer which can be irradiated by the irradiation system to produce a workpiece layer;
    a control unit, which is adapted to define an irradiation region for each of the irradiation units, wherein the irradiation regions each comprise a portion of an irradiation plane which extends parallel to the carrier, and wherein the control unit is further adapted to define the irradiation regions in such a manner that they overlap in a common overlap region;
wherein the control unit is further adapted to control the device in such a manner that raw material powder layers arranged in succession on the carrier can be irradiated by the irradiation system to produce successive workpiece layers.

The device can generally comprise any further features and components in order to be able to carry out all the steps mentioned above and to achieve all the effects mentioned above. In particular, the control unit can be configured to perform all variants in respect of the selection of the irradiation units to be used in the overlap region, the variation of the position of the overlap region in the irradiation plane, and the definition and/or changing of any partitioning regions.

According to a further variant, the device comprises at least four irradiation units and the irradiation regions are so defined that all the irradiation regions of the irradiation units overlap in a common overlap region. This lies preferably at least in part within a quadrilateral spanned by the irradiation unit.

Figure 2:
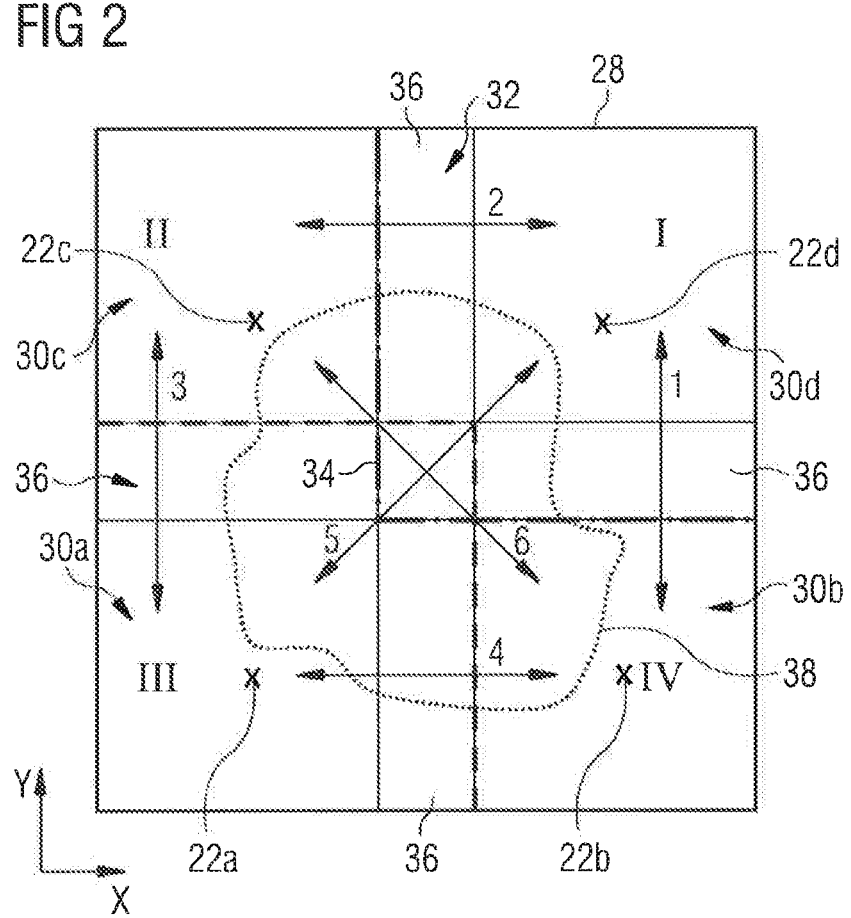
Figure 3:
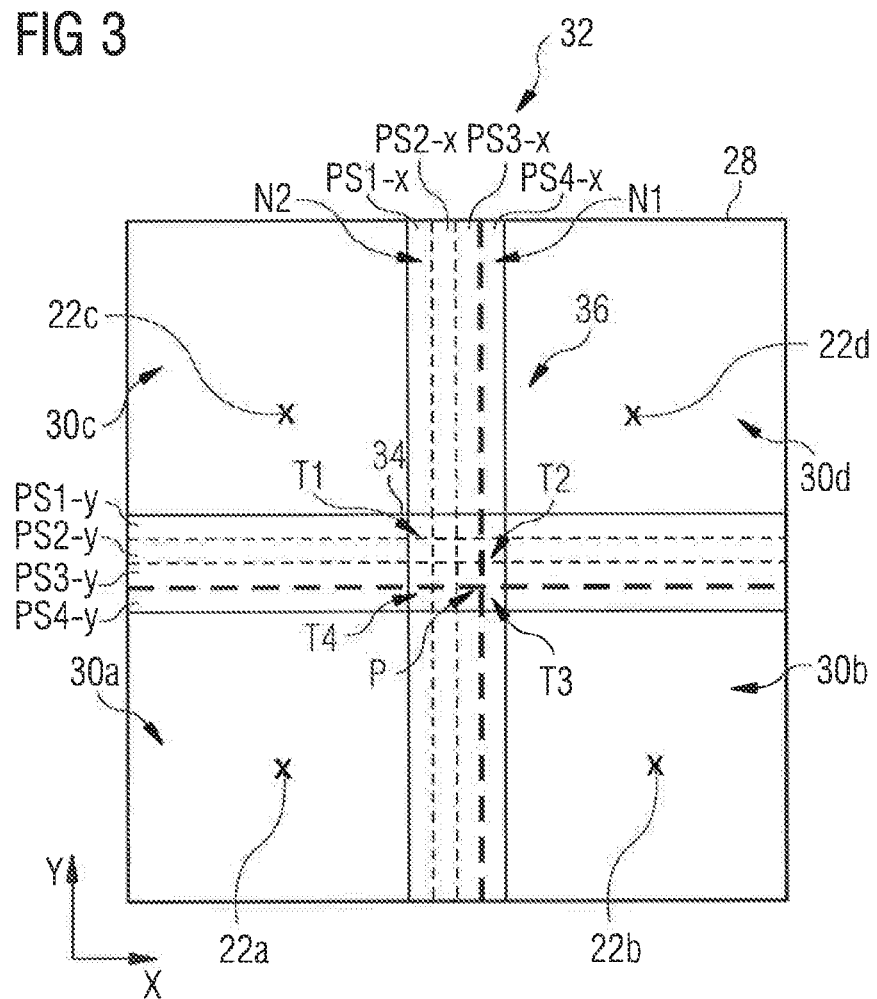

The invention will be explained hereinbelow with reference to the accompanying figures, in which:
    FIG. 1: is a view of a device according to the invention which carries out a method according to the invention;
    FIG. 2: is a representation of the irradiation regions of the device of FIG. 1;
    FIG. 3: is a representation of possible partitioning regions of the device of FIG. 1; and
    FIGS. 4, 5: show possible arrangements of the irradiation units in a device of FIG. 1.

FIG. 1 shows a device 10 which is configured to carry out a method according to the invention for the additive manufacture of three-dimensional workpieces from a metallic powder bed. More precisely, the method relates to a manufacturing process in the manner of so-called selective laser melting (SLM). The device 10 comprises a process chamber 12. The process chamber 12 can be sealed with respect to the surrounding atmosphere, so that an inert gas atmosphere can be established therein. A powder application device 14, which is arranged in the process chamber 12, applies raw material powder layers to a carrier 16. As is shown in FIG. 1 by an arrow A, the carrier 16 is adapted to be displaceable in a vertical direction. The carrier can thus be lowered in the vertical direction as the build height of the workpiece increases as it is built up layer by layer from the selectively solidified raw material powder layers.

The device 10 further comprises an irradiation system 20 for selectively and location-specifically directing a plurality of laser beams 24a,b onto the raw material powder layers on the carrier 16. More precisely, the raw material powder material can be exposed to radiation by means of the irradiation system 20 in accordance with a geometry of a workpiece layer that is to be produced, and thus locally melted and solidified.

The irradiation system comprises four irradiation units 22a-d, of which only the front two irradiation units 22a-b are visible in FIG. 1. The further irradiation units 22c-d, on the other hand, are displaced into the plane of the drawing and thus arranged behind the irradiation units 22a-b visible in FIG. 1.

Each of the irradiation units 22a-d is coupled to a common laser beam source. The laser beam emitted by the laser beam source can be split and/or deflected by suitable means, such as, for example, beam splitters and/or mirrors, in order to guide the laser beam to the individual irradiation units 22a-d. Alternatively, it would be conceivable to allocate each of the irradiation units 22a-d its own laser beam source. A suitable laser beam source can be provided, for example, in the form of a diode-pumped ytterbium fiber laser having a wavelength of approximately from 1070 to 1080 nm.

Each of the irradiation units 22a-d further comprises a processing beam optics, in order to interact with the laser beam provided. The processing beam optics each comprise a deflection device in the form of a scanner unit, which is able flexibly to position the focus point of the laser beam 24a,b emitted in the direction of the carrier 16 within an irradiation plane 28 extending parallel to the carrier 16.

The irradiation plane 28 represents a virtual plane which contains a raw material powder layer which is arranged uppermost on the carrier 16 and is currently to be irradiated to produce a workpiece layer. The position of the irradiation plane 28 thus changes relative to the carrier 16 as the number of applied and irradiation raw material powder layers increases. By lowering the carrier 16, however, it can also be provided that the position of the irradiation plane 28 relative to the irradiation units 22a-d does not change, since it is always arranged constantly inside the process chamber 12.

The irradiation of the raw material powder layers by the irradiation system 20 is controlled by a control unit 26. The control unit is further configured to define for each of the irradiation units 22a-d a likewise virtual irradiation region 18a-d which each extend in the irradiation plane 28 and comprise a predetermined portion thereof. In the representation of FIG. 1, again only the irradiation regions 18a-b of the irradiation units 22a-b visible therein are shown.

FIG. 2 shows a plan view of the carrier 16 and the irradiation plane 28 from the point of view of the irradiation system 20. It will be seen that the irradiation plane 28 is square in shape and accordingly comprises four quadrants I-IV of equal size. One of the irradiation units 22a-d is arranged approximately in the center of each of those quadrants I-IV. The control unit 26 defines an irradiation region 30a-d for each of the irradiation units 22a-d. In the case shown, the irradiation regions 30a-d for each of the irradiation units 22a-d are chosen to be of equal size and rectangular. Furthermore, they are so defined that the irradiation units 22a-d are arranged slightly eccentrically within the irradiation regions 30a-d.

The outline or, in other words, the region boundary, of the irradiation region 30a is picked out in FIG. 2 by a broken line. The same is true for the outline of the irradiation region 30d, which is depicted by a dot-and-dash line. The outlines of the further irradiation regions 30b,c are in principle chosen to be of similar type. Consequently, it will be seen that the irradiation regions 30a-d overlap several times, wherein overall a cross-shaped overlap zone 32 is defined within the irradiation plane 28.

In its center, the overlap zone 32 has a common overlap region 34, in which all the irradiation regions 30a-d coincide and overlap. Starting from this overlap region 34, which in the present case is square, further secondary overlap regions 36, in which in each case only two of the irradiation regions 30a-d overlap, extend in a cross shape.

In summary, it will thus be seen that the irradiation units 22a-d are so arranged that they together span a polygon in the form of a rectangle, and that their irradiation regions 30a-d are further so defined that the common overlap region 34 is arranged centrally within the rectangle.

In FIG. 2, an outline of a workpiece layer 38 to be produced is also shown. In known manner, it is provided that the outer contour thereof is produced by location-specific irradiation and solidification of the currently uppermost raw material powder layer. In addition or alternatively, it can be provided that the workpiece cross-sectional area framed by the outline is formed substantially completely solidified and thus filled or, in other words, solid. This can take place by means of known irradiation patterns comprising, for example, a plurality of scan vectors running parallel to one another.

Primarily, it will be seen from FIG. 2 that the workpiece layer 38 to be produced has different portions with which it extends into the individual irradiation regions 30a-d, but also into the overlap region 34 and the secondary overlap regions 36. In order to produce the workpiece layer, the irradiation units 20a-d must thus be controlled in a coordinated manner by the control unit 26 in order that they are each able to produce a portion of the workpiece layer 38 that is assigned to them.

In those cases in which a relevant portion of the workpiece layer 38 to be produced extends solely in one of the irradiation regions 30a-d and outside the overlap zone 32, that portion can be directly solidified by the associated irradiation unit 22a-d. For those portions of the workpiece layer 28 that extend within the overlap zone 32, on the other hand, the control unit 26, which carries out the method according to the invention, provides that the irradiation units 20a-d actually used for the irradiation are purposively selected.

In FIG. 2 there are shown, for example, a plurality of double-headed arrows 1-4 which each extend between two of the irradiation regions 30a-d and pass through one of the secondary overlap regions 36. If, for the production of a desired workpiece layer, a laser beam 24a-b is to be guided along one of those double-headed arrows 1-4, the control unit 26 decides which of the irradiation units 22a-d within the common secondary overlap region 36 should perform the irradiation of the raw material powder layer. In addition or alternatively, however, it can also be provided that both of the irradiation units 22a-d that are associated with a common secondary overlap region 36 are selected for this irradiation.

In the case of the double-headed arrow 1, this means that, in the case of an irradiation movement from bottom to top in FIG. 2, irradiation is first performed by the irradiation unit 22b, until the secondary overlap region 36 between the irradiation regions 30b and 30d is reached. From that point onwards, the control unit 26 can, for example, specify that the irradiation unit 22b continues the irradiation until it reaches the upper boundary of the secondary overlap region 36 in FIG. 2. The further irradiation along the double-headed arrow 1 must then be taken over by the irradiation unit 22d.

However, two further double-headed arrows 5-6 are also shown in FIG. 2, which arrows extend diagonally within the irradiation plane 28 and in particular through the common overlap region 34. Since all the irradiation regions 30a-d overlap within that overlap region 34, the control unit can choose in that region between all the irradiation units 22a-d in order to irradiate the portion of the raw material powder layer enclosed thereby.

In relation to the double-headed arrow 5, and when considered from bottom left to top right in FIG. 2, this means that irradiation first takes place by means of the irradiation unit 22a, until the common overlap region 34 is reached. There, the control unit 26 can then specify which of the irradiation units 22a-d is to be selected for the irradiation of the raw material powder layer in that region, or whether even a plurality or all of the irradiation units 22a-d should work together for that purpose. After crossing the common overlap region 34, the irradiation along arrow 5 is again continued with the upper right irradiation unit 22d in FIG. 2.

When selecting the irradiation units 22a-d for irradiating the overlap region 34, the control unit 26 can consider only those irradiation units 22a-d which are also used outside the overlap region for carrying out the desired irradiation. The further irradiation units 22b,c, which are not used for irradiation outside the common overlap region 34, on the other hand, can deliberately not be selected in order to minimize the risk of imprecise transitions within the workpiece structure due to frequent changing of the irradiation units 22a-d.

It is an aim of the exemplary embodiment shown to make use of the multiple overlaps of the irradiation regions 30a-d and the described selection possibilities between the irradiation units 22a-d to be used, in such a manner that the structure of the manufactured workpiece is as homogeneous as possible. The inventors have recognized that an improvement in homogeneity can be achieved, for example, if the irradiation conditions are chosen to be as variable as possible in order not to produce the same inaccuracies at the same position in each workpiece layer.

According to the present exemplary embodiment, this can be achieved in that, for each individual raw material powder layer to be irradiated, it is selected which of the irradiation units 22a-d are actually used in the common overlap region 34 and/or the secondary overlap regions 36. Furthermore, it is ensured that this selection differs in successive raw material powder layers. Owing to the constantly changing selection of irradiation units 22a-d, the irradiation conditions within the overlap zone 32 can thus be changed layer by layer.

It can likewise be provided according to the present exemplary embodiment that, by redefining at least some of the irradiation regions 30a-d layer by layer, a position of the common overlap region 34 within the irradiation plane 28 is changed layer by layer. The overlap region 34, and in particular a geometric midpoint thereof, is thereby displaced within the irradiation plane 28. The overlap region 34 is thereby displaced along at least one of the X-Y-axes of the irradiation plane 28 running orthogonally to one another, before irradiation of a new raw material powder layer, either randomly or according to a predetermined pattern.

There comes into consideration as a predetermined pattern a spiral, wherein the overlap region 34 shown in FIG. 2 is arranged at the center of such a spiral. It is likewise conceivable to displace the overlap region in the manner of a so-called knight's move. Further suitable patterns can be a so-called "random chessboard", which also includes a random movement component, or a movement in accordance with a "maximum spacing".

FIG. 3 shows a further variant for irradiating the raw material powder layer, which variant can be carried out with the present embodiment. There will again be seen the irradiation plane 28 and the cross-shaped overlap zone 32 arranged therein. With the exception of the subdivision of the overlap zone described hereinbelow, this example is analogous to that of FIG. 2. Therefore, for reasons of clarity, not all the reference numerals have been entered in FIG. 3.

FIG. 3 shows various possibilities of how the overlap zone 32 can be subdivided in different ways by varying partitioning region boundaries between successive raw material powder layers to be irradiated. A current position of the partitioning region boundaries is shown in FIG. 3 by solid and broken lines.

FIG. 3 shows by dotted lines further variants of the choice of the partitioning region boundaries. Overall, it will be seen that the overlap zone 32 can be subdivided into different partitioning zones according to the choice of partitioning region boundaries, which partitioning zones can be composed, for example, of the portions PS1x-PS4x, PS1y-PS4y shown in FIG. 3. These partitioning regions can again each be associated with one of the irradiation units 22a-d.

The choice of suitable partitioning region boundaries and associated partitioning regions of the overlap zone 32 can take place in particular with regard to the common overlap region 34. There it will be seen that the partitioning region boundaries intersect at a common point P. The common overlap region 34 is accordingly likewise divided into four portions of different sizes, each of which forms a partitioning region T1-4 of the common overlap zone 34. Each of those partitioning regions T1-4 is associated with one of the irradiation units 22a-d, wherein the upper left irradiation unit 22c in FIG. 3 is associated with the largest partitioning region T1 and the lower right irradiation unit 22b is associated with the smallest partitioning region T3.

As discussed above, a transfer between the irradiation units 22a-d can take place immediately at the partitioning region boundaries in order to produce a common workpiece layer (that is to say, irradiation is immediately continued by an irradiation unit 22a-d that is associated with an adjacent partitioning region). In addition or alternatively, the partitioning region boundaries can also merely define a general region which can also temporarily be crossed, for example in the case of irradiation along a predetermined vector by the irradiation units 22a-d. Irradiation along a new irradiation vector which from the point of view of the irradiation unit 22a-d in question only begins after the partitioning region boundary cannot be made possible, however.

In order to vary the irradiation conditions between successive raw material powder layers, the embodiment shown provides the possibility of varying the position of the intersection point P of the partitioning region boundaries within the common overlap region 34. Concretely, the intersection point P can be displaced along at least one of the X-Y-axes. Analogously to the displacement, discussed above, of the common overlap region 34 as a whole, the intersection point P can be displaced randomly or according to a predetermined pattern. As a consequence of the displacement of the intersection point P, the sizes of the partitioning regions T1-4 also change.

Consequently, the same portion of the common overlap region 34 can be irradiated by different irradiation units 22a-d depending on a position of the intersection point P and considered over a plurality of successive raw material powder layers, namely depending on the partitioning region T1-T4 in which the relevant portion is currently contained.

For the sake of completeness, the possibility of subdividing the upper secondary overlap region 36 shown in FIG. 3 will be discussed hereinbelow. In this case there will be seen four possible subdivisions by the choice of corresponding secondary partitioning regions N1, N2, each of which is composed of the portions PS1x-PS4x. Owing to the currently chosen partitioning region boundaries, a comparatively small portion PS4x is associated with the upper right irradiation unit 22d in FIG. 3. A significantly larger portion of this secondary overlap region 36, comprising the further portions PS1x-PS3x, on the other hand, is associated with the upper left irradiation unit 22c.

As explained, the partitioning region boundaries can be changed between successive raw material powder layers by means of the control unit 26. This can take place in particular in that the secondary partitioning regions N1, N2 defined by the portions PS1x-PS4x differ from one another between the successive raw material powder layers. If, for example, in the variant according to FIG. 3 the irradiation of the current raw material powder layer is complete, the control unit 26 can displace the partitioning region boundaries represented by broken lines so that the upper secondary overlap region 36 is divided in the middle. Consequently, a secondary partitioning region N1 comprising the portions PS3x-PS4x would be associated with the irradiation unit 22d, and a secondary partitioning unit N2 comprising the portions PS1x-PS2x would be associated with the irradiation unit 22c.

It will be appreciated that this can also be carried out for all further secondary overlap regions 36. In the exemplary embodiment shown, however, all the subdivisions of the secondary overlap regions 36 and of the common overlap region 34 are varied at the same time, namely by the above-described displacement of the intersection point P within the common overlap region 34.

In summary, several possibilities are thus provided which utilize the presence of at least three irradiation units 22a-d and of an overlap region 34 formed thereby in order to improve the homogeneity of a manufactured workpiece structure. These possibilities concern the displacement of the overlap region 34 and the variable selection of the irradiation units 22a-d according to FIG. 2 and the variable subdivision of the overlap zone 32 by individual partitioning regions T1-T4 according to FIG. 3. The device 10 can in principle be configured to perform all of these possibilities. Which of these possibilities is applied to individual or also a plurality of successive raw material powder layers can be determined beforehand for the entire workpiece that is to be manufactured or also individually for each workpiece layer that is to be produced.

Figure 4:
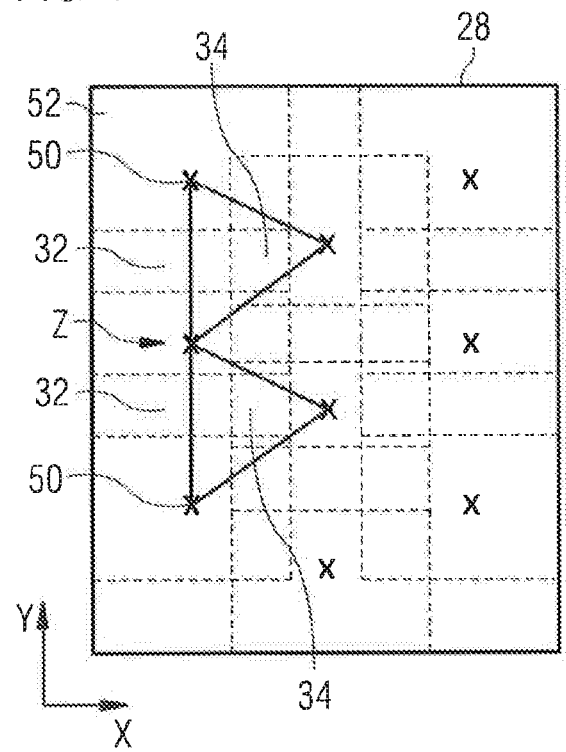
Figure 5:
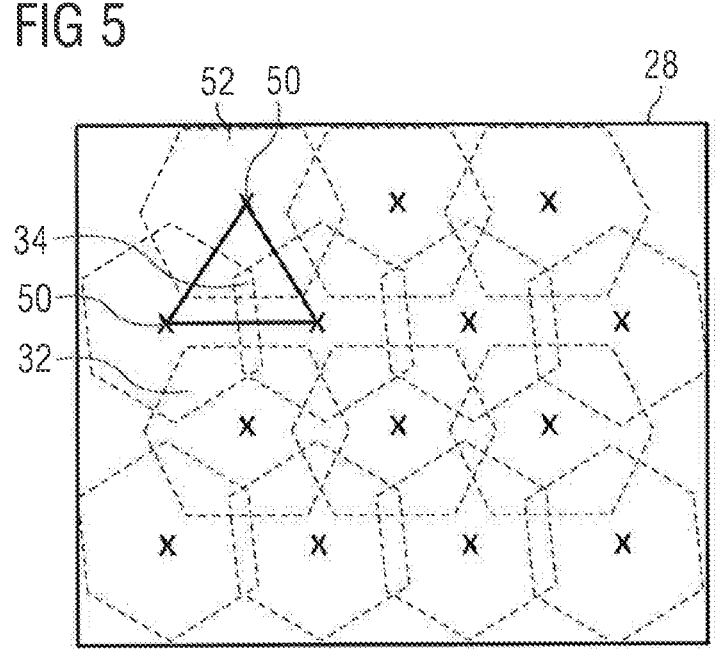

FIGS. 4 and 5 show further possibilities for the arrangement of a plurality of irradiation units, which are shown in the form of crosses and are always provided with the same reference numeral 50. For reasons of clarity, however, not all the irradiation units have been provided with that reference numeral. The views of FIGS. 4 and 5, analogously to FIGS. 2 and 3, likewise show a plan view of an irradiation plane 28. The arrangements of the irradiation units 50 shown in FIGS. 4 and 5 can in principle be used in the device 10 discussed above. Therefore, in the following, the same reference numerals will be used for features of the same type or having the same effect.

In FIG. 4 it will be seen that a total of nine irradiation units 50 are provided, which are offset relative to one another within the irradiation plane 28 along the Y-X-axes. Concretely, three irradiation units 50 arranged one behind the other in the Y direction are shown, wherein a total of three of these rows are provided and spaced apart from one another along the X-axis. A middle row is offset downwards relative to the outside rows when viewed in the Y direction. Overall, this has the result that a group of three irradiation units 50 is formed in each case, the square irradiation regions 52 of which units overlap in a common overlap region 34. For reasons of clarity, not all the irradiation and overlap regions 34, 52 in FIGS. 4 and 5 are provided with a corresponding reference numeral.

The spanning of a triangle is shown more precisely in FIG. 4 for two selected groups. It will be seen that the irradiation units 50 are in each case arranged in the middle of their square overlap regions 52. The irradiation units 50 within a group thereby span a schematically indicated virtual triangle, in which the common overlap region 34 is almost completely arranged. Again, there will also be seen a plurality of secondary overlap regions 36, in which only the irradiation regions 52 of two irradiation units 50 overlap. It will further be seen that each irradiation unit 50 interacts with further irradiation units 50 outside an individual group spanning a triangle and also overlaps with the irradiation regions 52 thereof. In other words, one irradiation unit 50 can be associated with a plurality of groups of irradiation units 50 with which it forms a common overlap region 34. This concerns, for example, the irradiation unit 50 marked by the arrow Z in FIG. 4, which is to be associated with both of the triangle-shaped groups shown in FIG. 4.

Consequently, the irradiation units 50 in FIG. 4 are so arranged relative to one another that their irradiation regions 52 form at least two common overlap regions 34 with in each case two further irradiation units 50.

It will be appreciated that, in the case of FIG. 4 too, all of the above-mentioned possibilities for varying the irradiation conditions can be applied, for example in the form of a variable selection of irradiation units 50 to be used in the overlap regions 34 or a variable displacement of the positions of the overlap regions 34 within the irradiation plane 28.

The same also applies to the variant according to FIG. 5, in which a total of fourteen irradiation units 50 are arranged in mutually offset rows. The irradiation units 50 each have hexagonal or, in other words, a honeycomb-shaped irradiation region 52. For reasons of clarity, again not all of the described features are provided with a corresponding reference numeral.

The irradiation units 50 are again so arranged that groups of three irradiation units 50 are formed, which together span a triangle which encloses a common overlap region 34. It will additionally again be seen that each irradiation unit 50 interacts with a plurality of adjacent irradiation units 50 and thus also defines a plurality of common overlap regions 34 and/or secondary overlap regions 36. Both in FIG. 4 and in FIG. 5, however, no overlap regions 34 are formed by more than three different irradiation regions 52, which as before permits precise transitions in the workpiece structure with nevertheless variable irradiation possibilities.

The invention claimed is:

1. A method for controlling an irradiation system, wherein the irradiation system is used in a device for the additive manufacture of three-dimensional workpieces, the irradiation system comprising at least three irradiation units, wherein the method comprises the following steps:
    defining an irradiation region for each of the irradiation units, wherein the irradiation regions each comprise a portion of an irradiation plane which extends parallel to a carrier of the device and wherein the irradiation regions each comprise at least a portion of a raw material powder layer arranged on the carrier to produce a workpiece layer, and wherein the irradiation regions are so defined that they overlap in a common overlap region;
    subdividing the overlap region into a plurality of partitioning regions, each of which is associated with at least one of the irradiation units, wherein partitioning region boundaries of the partitioning regions intersect at a common intersection point;
    irradiating the raw material powder layer arranged on the carrier using the defined irradiation regions to produce a workpiece layer;
    arranging a further raw material powder layer on the already irradiated raw material powder layer to produce a further workpiece layer; and
    changing the partitioning region boundaries so that the partitioning regions differ from one another between two successive raw material powder layers, wherein a position of the common intersection point is varied.

2. The method as claimed in claim 1, wherein the proportions of the irradiation regions relative to a total area of the irradiation plane are each greater than 0% and less than 100%, and/or
    wherein the proportion of the overlap region relative to a total area of the irradiation plane is greater than 0% and less than 100%.

3. The method as claimed in claim 1, wherein the irradiation units and/or centers of the irradiation regions span a polygon.

4. The method as claimed in claim 1, further comprising the step of:
    selecting at least one irradiation unit to be used for irradiation of the overlap region.

5. The method as claimed in claim 4, wherein the selection step is carried out again before the further workpiece layer is irradiated.

6. The method as claimed in claim 4, wherein the selection of the at least one irradiation unit to be used for the overlap region differs between two successive raw material powder layers.

7. The method as claimed in claim 4, wherein a plurality of irradiation units is selected for the irradiation of the overlap region, in order to irradiate the overlap region by the plurality of irradiation units in parallel or in succession.

8. The method as claimed in claim 4, wherein, for selecting the at least one irradiation unit for the overlap region, the following step is carried out:
    selecting at least one irradiation unit for the irradiation of the overlap region in the irradiation regions of which the workpiece layer to be produced also extends outside the overlap region; or
    selecting at least one irradiation unit for the irradiation of the overlap region in the irradiation regions of which the workpiece layer to be produced does not extend outside the overlap region.

9. The method as claimed in claim 1, wherein the defining of the irradiation regions is carried out in such a manner that the arrangement of the overlap region within the irradiation plane changes between two successive raw material powder layers.

10. The method as claimed in claim 1, wherein the variation of the intersection point takes place randomly or according to a predetermined pattern.

11. The method as claimed in claim 1, wherein the irradiation system comprises at least one group of at least three irradiation units, comprising the steps of:
    arranging the irradiation units in such a manner that the irradiation units together span a polygon; and
    defining the irradiation region for each irradiation unit in such a manner that the common overlap region is arranged at least in part within the polygon.

12. The method of claim 1, wherein the plurality of partitioning regions fill the entirety of the overlap region.

13. The method of claim 1, wherein subdividing the overlap region comprises dividing the overlap region into the plurality of partitioning regions such that a union of the plurality of partitioning regions equals the overlap region.

14. The method of claim 1, wherein changing the partitioning region boundaries comprises changing the partitioning region boundaries so that each of the plurality of partitioning regions differs in size between two successive raw material powder layers.

15. A device for the layer by layer manufacture of three-dimensional workpieces, comprising:
    an irradiation system having at least three irradiation units;
    a carrier which is adapted to receive a raw material powder layer which is irradiatable by the irradiation system to produce a workpiece layer;
    a control unit which is adapted to define an irradiation region for each of the irradiation units, wherein the irradiation regions each comprise a portion of an irradiation plane which extends parallel to the carrier, and wherein the control unit is further adapted to define the irradiation regions in such a manner that they overlap in a common overlap region;
wherein the control unit is further adapted to control the device in such a manner that the overlap region is subdivided into a plurality of partitioning regions, each of which is associated with at least one of the irradiation units, wherein partitioning region boundaries of the partitioning regions intersect at a common intersection point, and the partitioning region boundaries are changed so that the partitioning regions differ from one another between two successive raw material powder layers, wherein a position of the common intersection point is varied; and
    wherein the control unit is further adapted to control the device in such a manner that raw material powder layers arranged in succession on the carrier are irradiatable using the defined irradiation regions to produce successive workpiece layers.

16. The device of claim 15, wherein the plurality of partitioning regions fill the entirety of the overlap region.

17. The device of claim 15, wherein subdividing the overlap region comprises dividing the overlap region into the plurality of partitioning regions such that a union of the plurality of partitioning regions equals the overlap region.

18. The device of claim 15, wherein changing the partitioning region boundaries comprises changing the partitioning region boundaries so that each of the plurality of partitioning regions differs in size between two successive raw material powder layers.

* * * * *